United States Patent
Bell et al.

(10) Patent No.: US 6,534,940 B2
(45) Date of Patent: Mar. 18, 2003

(54) MARINE MACERATOR PUMP CONTROL MODULE

(75) Inventors: John J. Bell, Los Alamitos, CA (US); Ronald Alan Stoffel, Anaheim, CA (US)

(73) Assignee: Smart Marine Systems, LLC, Los Alamitos, CA (US)

( * ) Notice: Subject to any disclaimer, the term of this patent is extended or adjusted under 35 U.S.C. 154(b) by 0 days.

(21) Appl. No.: 09/884,680

(22) Filed: Jun. 18, 2001

(65) Prior Publication Data

US 2002/0190687 A1 Dec. 19, 2002

(51) Int. Cl.[7] .................................................. H02P 1/18
(52) U.S. Cl. ........................ 318/434; 318/452; 318/430; 388/909; 4/319
(58) Field of Search ............................ 4/319; 318/430, 318/431, 434, 445, 452, 454; 388/909

(56) References Cited

U.S. PATENT DOCUMENTS

| | | |
|---|---|---|
| 2,707,440 A | 5/1955 | Long et al. |
| 2,774,929 A | 12/1956 | Schaefer |
| 3,283,236 A | 11/1966 | Legg |
| 3,408,940 A | 11/1968 | McGrogan |
| 3,568,771 A | 3/1971 | Vincent et al. |
| 3,610,779 A | 10/1971 | Hubby |
| 3,717,420 A | 2/1973 | Ruchocki |
| 3,776,661 A | 12/1973 | Wohnlich |
| 3,858,102 A | 12/1974 | Quinn |
| 3,918,843 A | 11/1975 | Douglas et al. |
| 3,931,559 A * | 1/1976 | McKee ........................ 318/455 |
| 3,936,231 A | 2/1976 | Douglas |
| 3,953,777 A | 4/1976 | McKee |
| 3,972,648 A | 8/1976 | Sangster |
| 4,021,700 A | 5/1977 | Ellis-Anwyl |
| 4,057,365 A | 11/1977 | Colmer |
| 4,058,757 A * | 11/1977 | Welton et al. ............... 318/474 |
| 4,076,457 A | 2/1978 | Skinner et al. |
| 4,108,574 A | 8/1978 | Bartley et al. |
| 4,159,550 A * | 7/1979 | Tobin, Jr. ...................... 4/319 |
| 4,161,792 A * | 7/1979 | Dallen et al. ................ 4/111.1 |
| 4,180,374 A | 12/1979 | Bristow |
| 4,195,968 A | 4/1980 | Emeny |
| 4,204,808 A | 5/1980 | Reese et al. |
| 4,241,299 A | 12/1980 | Bertone |
| 4,259,038 A | 3/1981 | Jorgensen et al. |
| 4,302,157 A | 11/1981 | Welton et al. |
| 4,302,158 A | 11/1981 | Brown |
| 4,311,438 A | 1/1982 | Comstedt |
| 4,329,120 A | 5/1982 | Walters |
| 4,370,098 A | 1/1983 | McClain et al. |
| 4,412,162 A | 10/1983 | Kitamura |
| 4,420,787 A | 12/1983 | Tibbits et al. |
| 4,421,643 A | 12/1983 | Frederick |
| 4,473,338 A | 9/1984 | Garmong |
| 4,505,643 A | 3/1985 | Millis et al. |
| 4,507,053 A | 3/1985 | Frizzell |
| 4,511,312 A | 4/1985 | Hartwig |
| 4,628,234 A | 12/1986 | Mizuta et al. |
| 4,641,067 A | 2/1987 | Izawa et al. |
| 4,841,404 A | 6/1989 | Marshall et al. |
| 5,015,151 A | 5/1991 | Snyder, Jr. et al. |
| 5,076,763 A | 12/1991 | Anastos et al. |
| 5,284,422 A | 2/1994 | Turner et al. |
| 5,324,170 A | 6/1994 | Anastos et al. |
| 5,575,085 A | 11/1996 | Groombridge |
| 5,928,514 A * | 7/1999 | Gothreaux .................. 210/617 |

* cited by examiner

*Primary Examiner*—Bentsu Ro
(74) *Attorney, Agent, or Firm*—Fulwider Patton Lee & Utecht, LLP

(57) ABSTRACT

A marine macerator switch including a comparator programmable with over and under current limits corresponding with the characteristics of a macerator drive motor. A sensing circuit senses the real time motor current and compares it with the current limits to, at respective predetermined differentials, shut the motor down. The control also includes a timer programmed to allow the motor to run for a period of time corresponding with that required for emptying of the tank.

26 Claims, 3 Drawing Sheets

MARINE MACERATOR PUMP CONTROL MODULE

BACKGROUND OF THE INVENTION

1. Field of the Invention

The invention relates to a system for controlling and protecting electrically driven pumps for liquids and is particularly directed to an apparatus and method for the control and protection of battery powered marine macerator pumps.

2. Description of the Prior Art

Local, state and federal marine regulations focusing on ecological considerations have imposed restrictions on the use of recreational and commercial boats to prevent discharge of unprocessed waste into the ocean and waterways. These requirements have led to an increased use of marine macerator pumps. Macerator pumps pulverize the refuse from onboard heads or holding tanks and pump it overboard. These pumps are typically turned on manually when it is desired to empty the refuse holding tank and run until manually shut off. This manual shut off requirement introduces the possibility of damage to the pump. A common occurrence is for the operator to turn the macerator on, become involved in other on-board activities or go ashore, forgetting to turn the macerator off. This results in unnecessary battery drain, excessive pump wear, and possible motor burnout. Another potential problem occurs when the pump is jammed and/or when the motor is inadvertently left on resulting in stall current flowing through the motor windings for an excessive time and causing damage to the motor and/or the switch.

Because of the expense, labor and inconvenience involved in replacing a macerator pump, a method of automatically sensing motor operating conditions and completion of the disposal operation to control the pump is desirable. It is recognized that electro mechanical indicators such as floats are used in some arts for detecting when a tank is empty. Such an arrangement is not generally acceptable for macerator pumps since these indicators are subject to failure due to adverse environmental conditions. Failure of such devices to properly detect completion of the pumping process can allow the pump to operate at no load leading to overheating which may result in damage to the pump. It is also desirable to detect when a pump is jammed to shut off the motor to prevent operation at stall currents and the consequent damage of the motor and pump due to overheating.

Motor controls have been proposed in other arts to detect motor load. It has been proposed to monitor the work performed by a pump by sensing various electrical parameters, such as motor current. With this approach, the sensing and control is accomplished in a benign environment. Applications of this method of pump sensing and control are typically found in the oil producing industry and in water, sump and marine bilge pump control systems. Methods and apparatus of the type to control and protect oil well pumps and increase production are described in U.S. Pat. No. 4,473,338, Victor H. Garmong, Sep. 25,1984; U.S. Pat. No. 5,015,151, Dale R. Snyder et al, May 14, 1991; and U.S. Pat. No. 5,284,422, John M. Turner, Feb. 8, 1994. Methods and apparatus of the type to control and protect water, sump and marine bilge pumps are described in U. S. Pat. No. ; 4,841,404, William W. Marshall et al, Jun. 20,1989, and U.S. Pat. No. 5,324,170, William N. Anastos, Jun. 28, 1994. These systems typically act continuously to pump off an essentially continuously replenished supply of liquid. Such systems are generally rather elaborate and are installed in fluid pump systems far exceeding the cost of marine pulverizing systems. Furthermore, such systems to not typically provide protection against a sensing system failure which would allow the pump to continue to run after the work was completed in a stalled or dry condition.

There exists a need for a marine pulverizer motor control which is inexpensive and convenient to install. With the enactment of marine regulations requiring pulverizers for the majority of recreational boats having heads onboard, the demand for pulverizer controls has grown significantly. Pulverizers used in recreational boats are generally inexpensive and any practical control therefor must also be relatively inexpensive. Since the holding systems for many such boats already incorporate pulverizers, it is important that any control be convenient to retrofit into the circuitry of a previously installed pump motor. It would also be desirable that any such control be contained in a compact housing having connectors readily connectable to the circuitry of the pump motor without a need for a high skilled installation technician.

SUMMARY OF THE INVENTION

The present invention provides an electrical control and protection module which can be economically and easily installed in a marine dc motor driven macerator pump power circuit. The module responds to a manual start command to automatically control the pump throughout the disposal operation and to remove pump power when disposal has been completed and the refuse holding tank is empty. It will be appreciated that, upon full evacuation of the holding tank, the unloaded pump will run free thus reducing the load on the motor causing the current drawn by such motor to assume its lowest level to, when motor current levels fall outside a pre-set range to shut the motor off. On the other hand, when the pump encounters undue resistance, as in a clogged impeller, the current to such motor will rise to a stall condition thus presenting a risk of overheating the motor or associated circuitry. We have discovered that these current conditions in the motor can be sensed to cause the module to control motor operation.

The module also includes a backup timer to monitor elapsed pump operating time and terminate pump operation when the elapsed operating time exceeds the maximum time required to empty the holding tank. This serves to protect the system against a sensing failure which otherwise might allow uninterrupted pump operation leading to overheating and damage.

Motor manufacturers typically publish specifications setting the maximum and minimum sustained current level for the particular motor. Such motors typically start at stall current levels, which exceed the maximum allowable sustained current level for a very short time, but then quickly accelerate building up back EMF which tends to oppose current flow dropping the operating current down to a nominal operating level. At start up, a macerator pump requires a short period of time to stabilize during which time the motor current may drop below minimum allowable sustained current levels until nominal flow levels are reached. As the holding tank is emptied and the pumping load is reduced due to liquid starvation, the motor current will also drop below minimum allowable current levels. Occasionally air bubbles will pass through the pump momentarily reducing the pumping load and also the operating current. To accommodate these characteristics of pumps and motors, and avoid premature shutdown of the disposal operation, several features have been provided by a preferred embodiment of the control module of this invention.

The preferred embodiment control module contains firmware programmable to set maximum and minimum sustained motor current limits, maximum motor operating time, and predetermined delays to momentarily delay unwanted motor shutdown. In this regard, it will be appreciated that motor current will surge both at start up and when the pump is momentarily unloaded during operation as by the passage of an air plug or air bubbles through the pump impeller during the macerating process. It will also be appreciated that as the holding tank approaches full evacuation and the macerating process is being completed, the load on the pump will be decreased tending to reduce motor current which might initiate shut down. To prevent premature shut down, the module incorporates time delays responsive to the momentary current drop due to the encounter of air bubbles and to current drop at the end of the cycle to thus avoid premature shut down before full evacuation and purging of the fluid lines connected with the pump.

Some embodiments of the control module include voltage regulation equipment to regulate the on board battery voltage down to 5VDC for logic circuitry, a RAM, a real time current sensor device, a comparator to determine when the sensed real-time current exceeds the time normally required to macerate a full load.

The module may be pre-programmed by the manufacturer for various ranges of pump motor power and holding tank size. The appropriate module may be selected by the boat owner for his or her particular configuration. This renders the control module design adaptable for a wide range of DC motor pump applications and enables production of low cost, easily installed macerator pump control and protection modules.

DETAILED DESCRIPTION OF THE PREFERRED EMBODIMENT

The method and apparatus of the present invention provide for the control and protection of a marine macerator pump which utilized to pulverize refuse and pump it out of a holding tank. The control module of the present invention is wired in circuit between the power source and the macerator pump to automatically interrupt power when certain operating conditions are exceeded.

In a preferred embodiment to be described hereunder, the control module contains both programmable firmware and a RAM to store current limits, average current, maximum operating time, and delay times; a real time current sensor and elapsed operating time timer; a comparator to determine when the sensed real-time current exceeds limits or elapsed operating time exceeds a predetermined limit; and control circuitry including a FET and responsive to the comparator to control power to the macerator pump motor and impose the specified delays. Also, in a preferred embodiment, all logical operations, comparisons, A/D conversions, timing and memory functions reside in a single micro controller integral to the control module.

Figure 1:
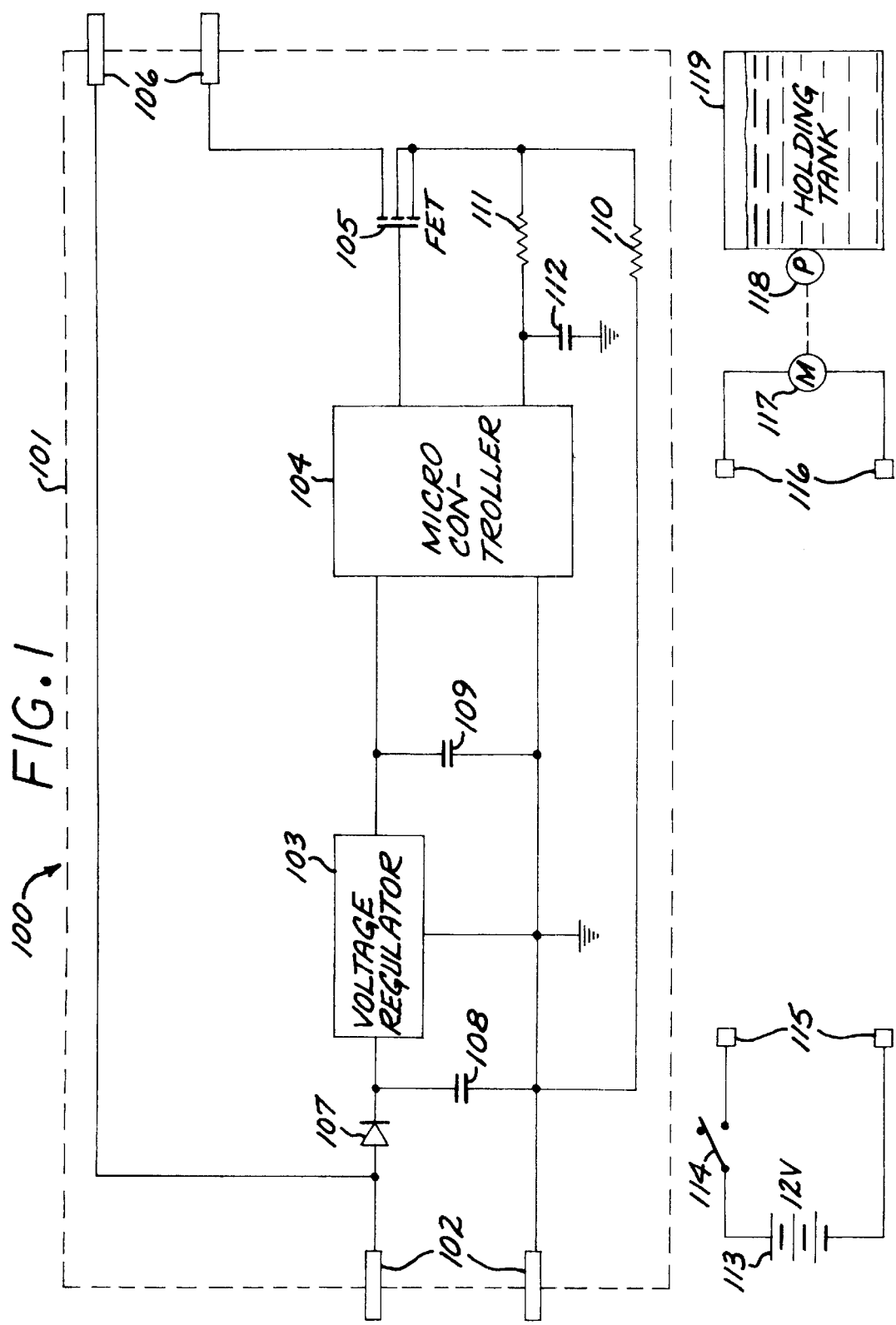
FIG. 1 is an electrical schematic of the preferred embodiment of the present invention, depicting the circuitry of the control module incorporated in a refuse disposal system.

Referring to FIG. 1, the preferred embodiment of the control module 100 of the present invention is conveniently housed in a small housing 101 in the form of a cube about 1½ inches on a side and having exterior electrical connectors 102, 106 to facilitate connection to the connectors 115, 116 of the on-board 12 volt battery 113 and the macerator pump motor 117. A printed circuit board (PCB) is included to facilitate component mounting and provide interconnecting circuitry between these components. A voltage regulator 103 is connected in the control module power input circuit 112 to step the voltage of the battery 113 down to 5VDC for the micro controller 104. Capacitors 108, 109 are also in circuit with the voltage regulator 103 to filter out electrical noise that might otherwise pass through to the micro controller and upset its operation. Also in circuit with the control module power input is a blocking diode 107 to protect module components against the possibility of an input voltage polarity reversal. This control module is designed to be easily installed by the boat owner and this feature affords protection to the inexperienced installer in the event he or she crosses the wires to the battery leads.

The micro controller 104 is the heart of the control module's operations. It contains firmware operable to receive and store various predetermined motor characteristic values including maximum and minimum allowable motor currents, maximum allowable motor current deviations from an average value, maximum allowable motor operating time determined from the time required for the pump 118 to empty the holding tank 119, and motor shutdown delays to accommodate the motor 117 startup transients, pump priming transients, liquid starvation and bubble pass through periods, and purging requirements. The firmware is typically preprogrammed by the manufacturer to simplify installation. The micro controller also contains a RAM which is initialized at power up with maximum and minimum current values stored in firmware and also receives and stores the average motor current value established immediately after pump priming and stabilization. A counter provides one second epochs for the program control loop shown in FIG. 3. Current sensing circuitry, a comparator, and motor power control circuitry are also provided in the micro controller and are described more fully below. A timer is incorporated in the motor power control circuitry and is responsive to time delays stored in firmware, and to a motor shutdown signal from the comparator, to delay motor shutdown during transients and during purging.

In order to perform its control task, the micro controller must continuously determine real time pump motor 117 current. This is accomplished by providing a known trace resistance 110 in the PCB circuit through which the motor current passes. The voltage built up across this resistance is filtered by resistor 111 and capacitor 112 to smooth out noise and ripples and is provided as an analog input to the micro controller. The micro controller then performs a computation whereby this voltage value is divided by the trace resistance value to determine real time current. An internal A/D convertor receives this analog value and converts it to digital format suitable for storing the average current value in the RAM and for comparator operations. The comparator compares real time current against the maximum and minimum allowable currents and compares the real time current deviations from the average current against the maximum allowable deviations and generates motor shutdown signals when the predetermined limits are exceeded. The comparator also tests elapsed motor operating time against the predetermined maximum value stored in RAM and generates a motor shutdown signal when the time limit has been exceeded.

The motor power control circuitry in the micro controller responds to control module power up by providing a control signal to a field effect transistor (FET) 105 to turn it on and allow motor current flow. The circuitry also responds to the motor shutdown signals issued by the comparator to check to determine if a delay is needed depending on the reason for the shutdown signal. If the shutdown signal is generated because the motor current exceeds the maximum allowable current during the start up transient period, the shutdown is delayed to allow current to drop to nominal values. If the time since start up has exceeded the transient period, the control circuit will respond to either one of the over current conditions to immediately remove the FET control signal to turn it off, and thereby interrupt current flow to the motor. If the shutdown signal is generated by the motor current exceeding either one of the low current conditions, motor shutdown is delayed to determine if the current drop was due to a momentary load decrease such as by passage of air bubbles or foam and if so, to allow it to return to normal current. If the current remains below the respective limit beyond the delay time, an additional purge delay is imposed and then the control circuit removes the FET control signal to remove power from the motor. Finally, if the shutdown signal is generated by the comparator because the elapsed operating time exceeds the maximum allowable operating time, the control circuit responds by immediately removing the FET control signal, shutting the motor down. Upon completion of motor shutdown for any of the above reasons, the control circuit is operative to put the control module in a sleep mode where the current draw is very low to conserve battery power, but to be responsive to the next power interruption and reapplication to begin another disposal operation.

It will be appreciated that the control module of the present invention is typically manufactured to be utilized with a selected range of macerator drive dc motors having different specifications and characteristics and pumping out holding tanks of various capacities. The micro controller firmware is factory adjustable to set the predetermined motor characteristics such as maximum deviations from the average current drawn by the motor, upper and lower current limits, and delay times. Additionally, the firmware will be preprogrammed to provide the maximum operating time limits according to the time required to empty holding tanks of various capacities. Thus, the boat owner will have a family of preprogrammed control modules to choose from to fit his particular needs.

The control module of the present invention is convenient and straightforward to install. An unskilled boat owner will typically purchase the control module at a marine hardware store or the like. Included with the switch will be instructions to install a toggle control switch 114 or the like on the control panel of the boat and connect it to the battery and to the connector 115 and to connect the control module connectors 102, 106 in series between the motor windings connector 116 and the battery/toggle switch connector 115. To further facilitate this installation, the voltage polarity protection diode 107 will ensure that the device is not damaged by the installer inadvertently crossing the wires during installation.

Figure 2:
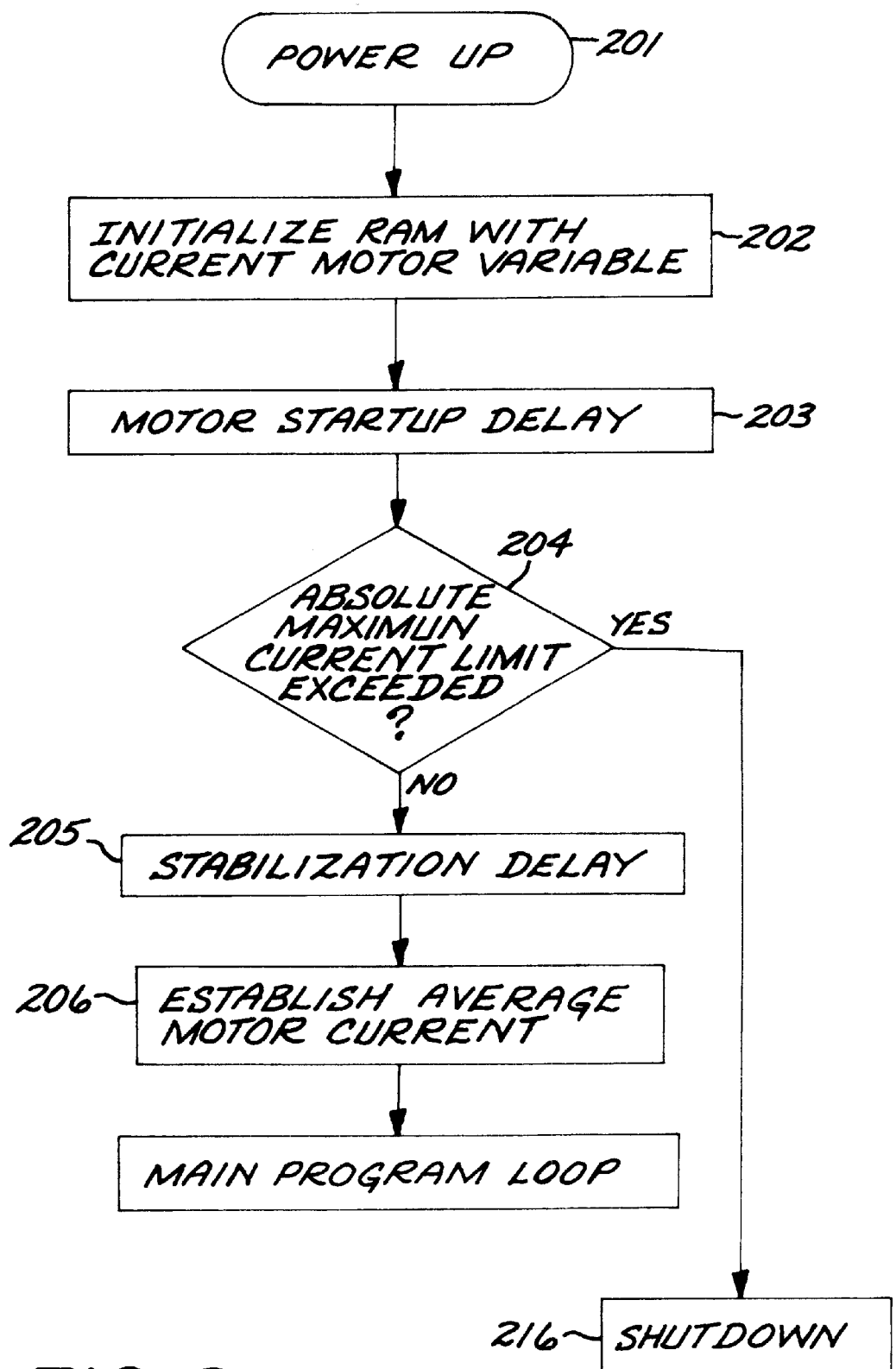
FIGS. 2 and 3 are flow diagrams for the preferred embodiment of FIG. 1 showing system power up and initialization followed by the motor current transient delay, system entry into the main program loop, loop process steps, and exit conditions leading to motor shutdown.

Referring now to FIG. 2, it will be appreciated that, when the control switch 114 is closed, power will be applied to energize the system as at 201 to cause the control module to perform a power-on reset and to initialize the RAM with the current motor variable from the pre-program firmware as at 202 to establish the maximum and minimum limits allowable by the specifications for such motor and to establish the maximum deviation allowable from average current.

The micro controller 104 is thus operable to turn on the FET to start the motor and to sense real time current to be compared with the maximum allowable current reference stored in the RAM. A one second motor shutdown delay as at 203 is operative at motor startup to allow for the normal transient current. After this delay, the micro controller will continuously sense real time current as at 204 for comparison with the maximum allowable current reference stored in the RAM. In the event the motor encounters mechanical difficulty resulting in an overload brought on by, for instance, a piece of metal such as a key or spoon being drawn into the macerator, or shorted output connections, the motor will continue to draw excessive current. In this case, the micro controller will advance to motor shutdown at 216, turning off the FET to remove power from the motor. Otherwise the motor will continue to operate.

Having successfully passed through the motor startup transient the next stage of a liquid pump operation is a period of load instability as the pump primes. During this time, the pumping load may fluctuate causing the ensuing motor current to drop below the minimum allowable current reference stored in the RAM. To allow for thus pump priming and stabilization, a 7.5 second motor shutdown delay is operative during as at 205 to maintain the circuit to the motor closed irrespective of the low current signal.

Figure 3:
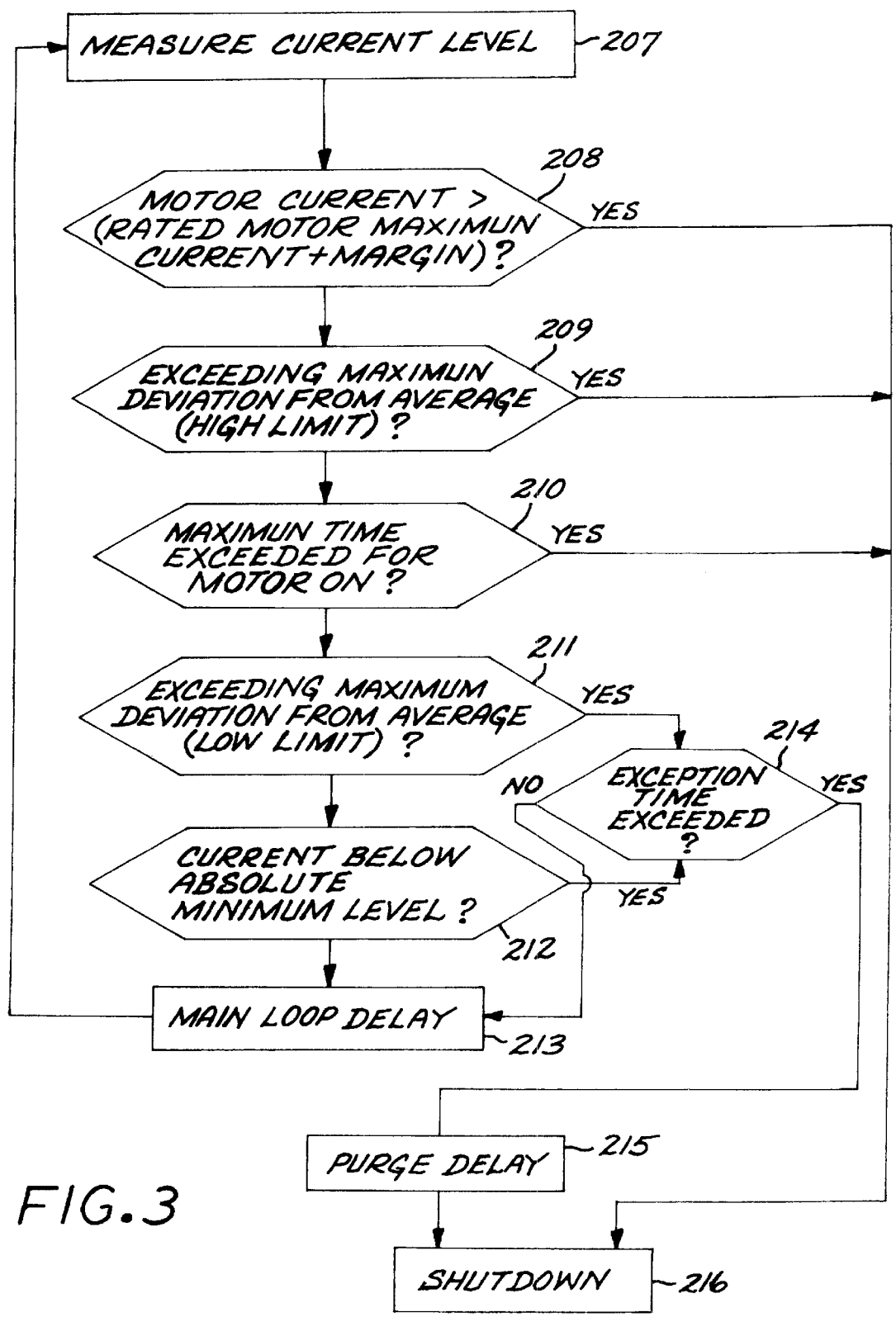

The micro controller next senses the now stable motor current and stores the A/D converted value in the RAM as average motor current under load as at 206. This value is used for future reference to determine deviations from the average for comparison with the maximum allowable deviations stored in RAM. The micro controller then enters what is referred to in the art as a program loop as shown in FIG. 3. As the pump continues operating at nominal load, the signal generated by the magnitude of the current sensed will be regularly compared with the reference signal stored in the RAM representative of the average current and with the reference signals corresponding with the respective predetermined limits.

The micro controller is thus operative to run the main program loop in one second epochs beginning with determining real-time motor current by performing an A/D conversion on the signal received from the real-time current sensor as at 207. This real-time motor current value is used for all subsequent comparisons during this one-second epoch and refreshed each time the micro controller repeats to step 207.

The micro controller comparator is then operable as at 208 to compare the signal corresponding with the real time current to the reference signal stored in the RAM corresponding with the maximum allowable current. In the event the maximum allowable current is exceeded, the micro controller will advance to motor shutdown at 216, turning off the FET to remove power from the motor. Otherwise the motor will continue to operate.

The micro controller comparator next compares the signal corresponding with the real time current to the average current value stored in RAM as at 209 and, if in excess by more than the allowable deviation, the micro controller will advance to motor shutdown at 216, turning off the FET to remove power from the motor. Otherwise the motor will continue to operate.

To guard against the possibility of a sensing failure which would cause the motor to continue operating until motor or pump damage occurs, the micro controller next performs a check of the elapsed operating time against the pre-set maximum as at 210 and, if it has been exceeded, the micro controller will advance to motor shutdown at 216, turning off the FET to remove power from the motor. Otherwise the motor will continue to operate. This time limit in the preferred embodiment is 7.5 minutes, the average time to empty a 90/100 gallon holding tank.

The micro controller next compares the real-time current signal as at 211 with the signal stored in the RAM corresponding with the average current to determine if such current has dropped below the average current value by more than the predetermined allowable deviation which may be indicative of air in the pump suggesting the holding tank is empty. If this maximum deviation below average current has not been exceeded, then the sensed signal is compared with the stored signal corresponding with the absolute minimum current as at 212 to determine if such real time current has dropped below the absolute minimum allowable value. In this manner, the module is operative to prevent damage or unnecessary operation in the event of no load such as an empty tank at startup which would generate an abnormally low average current for reference in step 211. If current levels are in the normal range, the micro controller increments its time counter as at 213 and repeats to step 207.

In the event either the absolute under current condition or the maximum differential under the average current exists, it is necessary to verify that it did not occur due to an air gap or bubble in the pump causing the motor to be momentarily unloaded, thus precipitously dropping the motor current. To avoid premature shut down under these conditions, the micro controller is operative as at 214 to render the motor shut down for the under current conditions inoperable for a predetermined period of time, such as five seconds. The micro controller is further operable to then proceed to step 213 to increment its time counter and repeat to step 207. The micro controller then repeatedly cycles through the program loop and performs all the checks previously described. If, during the five second delay, the current has returned to normal values, the micro controller simply resents the timer and continues running the program loop.

If the tank has been emptied, the motor will remain unloaded. In the event this unloaded condition continues for five seconds or more, resultant under current condition will cause the micro controller to execute a purge delay as at 215 to ensure the fluid lines are completely vacuous of liquid. The controller will then advance to motor shutdown at 216, turning off the FET to remove power from the motor. Any time the motor shutdown is performed as at 216, the micro controller then enters a sleep mode until power to the module is again interrupted and reapplied.

From the foregoing, it will be apparent that the macerator control module of the present invention provides an economical and effective means for monitoring pumping conditions of the macerator pump to effectively protect the motor from damage stemming from over or under motor current or excessive periods of pump operation. The preferred embodiment of the module is operative to prevent premature shut down during initial motor stabilization or from momentary unloading of the motor as by the passage of air gaps through the pump. The module may include a time delay for delaying shut down for a sufficient period of time to provide for full purging of the pump discharge lines.

Although the present invention is directed to a control module operating from a marine craft battery and controlling a direct current motor, it will be appreciated by those skilled in the art that the basic concept can be applied to operate an ac pump motor from an ac source. Inclusion of a voltage rectifier for logic power and letting the FET control a relay provides motor control. Rectification and sensing of the ac current passing through the relay would provide the real time current measurement needed to monitor pump operation in the same process as the preferred embodiment shown herein.

What is claimed is:

1. An electrical controller for connection with a motor driving a marine macerator pump and of the type having maximum and minimum allowable currents, said controller comprising:

a housing;

electrical connectors on said housing for connecting in circuit between said motor and a power source;

a memory in said housing for storing maximum and minimum reference signals corresponding with the respective said maximum and minimum allowable currents, and a reference time signal corresponding with the maximum allowable motor operating time for one pumping operation;

a sensor in said housing and connected with said memory and said electrical connectors for sensing the real time current level drawn by said motor to produce a sensed signal;

a timer in said housing and operative to measure elapsed motor operating time to produce an elapsed time signal;

a comparator in said housing, connected with said memory, sensor and timer and operative in response to said sensed signal exceeding said maximum reference signal and to falling below said minimum reference signal to generate respective first and second stop signals, said comparator further operative to compare said elapsed time signal with said reference time signal and responsive to said elapsed time signal exceeding said reference time signal to generate a third stop signal; and a control circuit in said housing connecting said connectors in circuit with said comparator and including a motor power switch, said control circuit responsive to a start signal to close said motor power switch to communicate power to said motor and responsive to either said first, second, or third stop signals, to open said motor power switch to remove power from said motor.

2. The controller of claim 1 wherein:

said memory includes a RAM and firmware, said RAM being operative to be initialized from said firmware with said respective maximum and minimum reference signals and said RAM also being operative to store a reference average current signal received from said sensor.

3. The controller of claim 1 wherein:

said control circuit includes a voltage regulator and reverse polarity protection diode to provide regulated power to said controller memory and logic circuits.

4. The controller of claim 1 wherein:

said motor power switch is a field effect transistor (FET) for switching power to said motor.

5. The controller of claim 1 wherein:

said sensor includes a trace resistor and an RC network to develop a filtered voltage in response to said motor current and an analog-to-digital converter and scaling circuitry to convert said filtered voltage to said sensed signal.

6. The controller of claim 1 wherein:
said control circuit includes a delay responsive to said first stop signal to delay opening of said motor power switch for a predetermined delay time at the motor startup.

7. An electrical controller as set forth in claim 1 for use with a motor of the type having an average operating current under the load of said pump and wherein:
said memory is operable to store a reference signal corresponding with said average operating current;
said comparator is operative to compare said sensed signal with said reference signal and is responsive to a differential there between exceeding a predetermined positive magnitude to generate a fourth stop signal; and
said control circuit is responsive to said fourth stop signal to open said motor power switch.

8. An electrical controller as set forth in claim 1 for use with a motor of the type having an average operating current under the load of said pump and wherein:
said memory is operable to store a reference signal corresponding with said average operating current;
said comparator is operative to compare said sensed signal with said reference signal and is responsive to a differential there between exceeding a predetermined negative magnitude to generate a fifth stop signal; and
said control circuit is responsive to said fifth stop signal to open said motor power switch.

9. The controller of claim 8 wherein:
said control circuit includes a delay responsive to said second and/or fifth stop signals to delay opening of said motor power switch for a predetermined delay time:
said control circuit is operative to, after said predetermined delay time, be responsive to said second and/or fifth stop signals, to generate a sixth stop signal; and
said control circuit is responsive to said sixth stop signal to open said motor power switch.

10. The control circuit of claim 9 wherein:
said control circuit includes a purge delay responsive to said sixth stop signal to delay opening of said motor power switch for a predetermined delay time.

11. A method of controlling a refuse disposal macerator pump driven by an electric motor, including:
determining the maximum time period for disposal of refuse by said macerator pump to establish a time limit and determining the respective maximum allowable high and low current deviations from an average motor operating current under load driving said macerator pump, said maximum high deviation indicative of onset of motor stall and said maximum low deviation indicative of completion of disposal of said refuse;
entering high and low deviation signals corresponding with said respective maximum allowable high and low current deviations in a comparator included in a controller of the type including said comparator and also including a timer operable to signal at said time limit;
starting said motor;
sensing the average operating current of said motor immediately after pump stabilization and entering an average current reference signal corresponding with said average operating current in said comparator;
repeatedly sensing the operating current of said motor and entering a real-time current signal corresponding with said operating current in said comparator;
repeatedly determining the deviations of said real-time current signal from said average current reference signal and comparing, in said comparator, said real-time deviation signals with the respective said high and low deviation signals to determine if either said high or low deviation has been exceeded; and
if said maximum or minimum deviations or said time limit are exceeded, turning off said motor.

12. The method of claim 11 that includes:
after said starting step, isolating said comparator from said motor for a motor stabilization period.

13. The method of claim 11 that includes:
in the event said low deviation is exceeded, delaying said turning-off step for a predetermined period, sensing said operating current again to generate a check signal to said comparator to be compared with said average current reference signal, and if said low deviation is exceeded, initiating said turning-off step.

14. The method of claim 11 that includes;
in the event said low deviation is exceeded, delaying said turning-off step for a predetermined period of time to allow said macerator pump to purge the remaining refuse therefrom.

15. An electrical controller for connection with a dc motor driving a marine macerator pump, said dc motor of the type having an average operating current under the load of operating said pump and maximum and minimum allowable currents, said controller comprising:
electrical connectors for connecting in circuit between said dc motor and an on-board battery power source;
a memory for storing a reference average signal corresponding with said average operating current, maximum and minimum reference signals corresponding with the respective said maximum and minimum allowable currents, and a reference time signal corresponding with the maximum allowable motor operating time for one pumping operation;
a sensor connected with said memory and said electrical connectors for sensing the real time current level drawn by said dc motor to produce a sensed signal;
a timer operative to measure elapsed motor operating time to produce an elapsed time signal;
a comparator connected with said memory, sensor and timer and operative to compare said sensed signal with the respective said maximum and minimum reference signals and responsive to said sensed signal exceeding the respective said maximum and minimum reference signals to generate respective first and second stop signals, said comparator further operative to compare said elapsed time signal with said reference time signal and responsive to said elapsed time signal exceeding said reference time signal to generate a third stop signal, said comparator further operative to compare said sensed signal with said reference average signal and responsive to the differential between said sensed signal and said reference average signal exceeding a predetermined positive magnitude to generate a fourth stop signal and responsive to the differential between said sensed signal and said reference average signal exceeding a predetermined negative magnitude to generate a fifth stop signal; and
a control circuit connecting said connectors in circuit with said comparator and including a voltage regulator and reverse voltage polarity protection diode to regulate power received from said battery power source to a predetermined voltage level suitable for said controller memory and logic circuits, said control circuit further including a field effect transistor (FET), said control circuit responsive to a start signal to turn on said FET to communicate power to said motor and responsive to either said first, second, third, fourth or fifth stop signals, to turn off said FET to remove power from said motor.

16. The controller of claim 15 wherein:

said memory includes a RAM and firmware, said RAM being operative to be initialized from said firmware with said respective maximum and minimum reference signals and said RAM also being operative to store said reference average signal received from said sensor.

17. The controller of claim 15 wherein:

said sensor includes a trace resistor and an RC network to develop a filtered voltage in response to said dc motor current and an analog-to-digital converter and scaling circuitry to convert said filtered voltage to said sensed signal.

18. The controller of claim 15 wherein:

said control circuit includes a delay responsive to said first stop signal to delay turning off said FET for a predetermined delay time at the dc motor startup.

19. The controller of claim 15 wherein:

said control circuit includes a delay responsive to said second and/or fifth stop signals to delay turning off said FET for a predetermined delay time:

said control circuit is operative to, after said predetermined delay time, be responsive to said second and/or fifth stop signals to generate a sixth stop signal; and said control circuit is responsive to said sixth stop signal to turn off said FET.

20. The control circuit of claim 19 wherein:

said control circuit includes a purge delay responsive to said sixth stop signal to delay turning off said FET for a predetermined delay time.

21. A marine refuse disposal system in circuit between a battery and dc motor driving a macerator pump, said dc motor of the type having an average operating current under the load of operating said pump and maximum and minimum allowable currents, said system, comprising:

a refuse holding tank;

an electrical controller connected with said dc motor;

a memory for storing a reference average signal corresponding with said average operating current, maximum and minimum reference signals corresponding with the respective said maximum and minimum allowable currents, and a reference time signal corresponding with the maximum time required for said pump to empty said tank;

a sensor connected with said memory and operative in response to the real time current level drawn by said dc motor to produce a sensed signal;

a timer operative to measure elapsed motor operating time to produce an elapsed time signal;

a comparator connected with said memory, sensor and timer and operative to compare said sensed signal with the respective said maximum and minimum reference signals and responsive to said sensed signal exceeding the respective said maximum and minimum reference signals to generate respective first and second stop signals, said comparator further operative to compare said elapsed time signal with said reference time signal and responsive to said elapsed time signal exceeding said reference time signal to generate a third stop signal, said comparator further operative to compare said sensed signal with said reference average signal and responsive to the differential between said sensed signal and said reference average signal exceeding a predetermined positive magnitude to generate a fourth stop signal and responsive to the differential between said sensed signal and said reference average signal exceeding a predetermined negative magnitude to generate a fifth stop signal; and a control circuit in circuit with said comparator and including a voltage regulator and reverse voltage polarity protection diode to regulate power received from said battery to a predetermined voltage level suitable for said controller memory and logic circuits, said control circuit further including a field effect transistor (FET), said control circuit responsive to a start signal to turn on said FET to communicate power to said motor and responsive to either said first, second, third, fourth or fifth stop signals, turn off said FET to remove power from said motor.

22. The system of claim 21 wherein:

said memory includes a RAM and firmware, said RAM being operative to be initialized from said firmware with said respective maximum and minimum reference signals and said RAM also being operative to store said reference average signal received from said sensor.

23. The system of claim 21 wherein:

said sensor includes a trace resistor and an RC network to develop a filtered voltage in response to said dc motor current and an analog-to-digital converter and scaling circuitry to convert said filtered voltage to said sensed signal.

24. The system of claim 21 wherein:

said control circuit includes a delay responsive to said first stop signal to delay turning off said FET for a predetermined delay time at the dc motor startup.

25. The system of claim 21 wherein:

said control circuit includes a delay responsive to said second and/or fifth stop signals to delay turning off said FET for a predetermined delay time:

said control circuit is operative to, after said predetermined delay time, be responsive to said second and/or fifth stop to generate a sixth stop signal; and said control circuit is responsive to said sixth stop signal to turn off said FET.

26. The system of claim 25 wherein:

said control circuit includes a purge delay responsive to said sixth stop signal to delay turning off said FET for a predetermined delay time.

* * * * *